ized Mar. 12, 1957

2,785,176
ETHYLENE UREA DERIVATIVES AND PROCESS OF PRODUCTION

Joseph Vebra, New Haven, Conn., assignor to Olin Mathieson Chemical Corporation, New Haven, Conn., a corporation of Virginia No Drawing. Application March 1, 1955, Serial No. 491,539

10 Claims. (Cl. 260—309.7)

This invention relates to new organic compounds represented by the formula

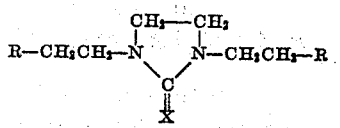

wherein "X" is a member of the group consisting of oxygen and sulfur, and "R" is a radical of the group consisting of —COOH, —COO (lower alkyl), and —CN and a process of producing the compounds.

The new compounds may be produced according to the process of this invention by reacting ethylene thiourea or ethylene urea with acrylonitrile in the presence of a strongly alkaline catalyst such as trimethylbenzylammonium hydroxide, or the hydroxides, alcoholates, amides or hydrides of the alkali metals, notably NaOH, KOH, NaOCH₃, and NaNH₂, in the presence of a solvent or diluent such as pyridine, dioxane, acetonitrile, benzene, toluene or xylene to form the bis-beta-cyanoethyl derivative, from which the free dicarboxylic acid can be obtained by hydrolysis, and the esters by the esterification of the acid or hydrolysis and esterification of the nitrile.

The reactions involved are shown by the following equations:

(1)

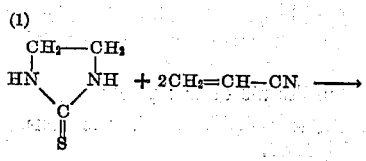

Ethylene thiourea

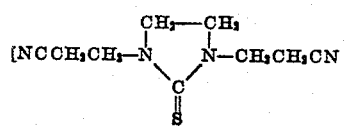

N,N'-bis (B-cyanoethyl) ethylene thiourea (2)

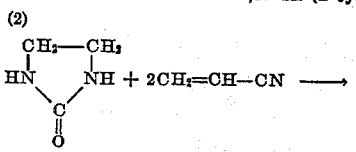

Ethylene urea

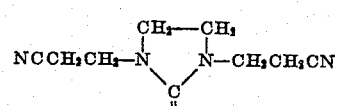

N,N'-bis-(B-cyanoethyl) ethylene urea

Upon hydrolysis by boiling with dilute sodium or other alkali metal hydroxide solution, the respective alkali metal salts of the dicarboxylic acids are obtained. These yield the free acids on treatment with dilute mineral acid.

The lower alkyl esters of the dibasic acids are readily formed by esterification with alcohols containing 1 to 6 carbon atoms such as methyl, ethyl, propyl, isopropyl, butyl, isobutyl, amyl and hexyl alcohols.

These compounds are valuable fungicidal and insecticidal materials. The dibasic acids are useful for synthetic resins, such as polyesters, polyamides and polyurethanes. The acids and esters of the thio derivatives are excellent antioxidants for soaps, fats and other oxidized compositions.

The following example illustrates a process carried out according to the invention for the producton of N,N'-bis-(B-cyanoethyl) ethylene thiourea, its dicarboxylic acid and its dimethyl ester.

Example 1

102 grams (1 mole) of ethylene thiourea was mixed with 400 cc. of pyridine. The mixture was heated with stirring to 90° C. and then cooled to 45° C. There was then added 12 grams of a 40% aqueous solution of benzyl trimethylammonium hydroxide. To the stirred solution at 40° C., there was added dropwise 116.5 grams of acrylonitrile (2.2 moles) during the course of 30 minutes. Stirring was continued for 2½ hours during which time the temperature fell to 34° C. The mixture was treated with dilute hydrochloric acid (12 cc. of concentrated hydrochloric acid plus 36 cc. of water) and filtered after cooling to 18° C. The dried yellow powder obtained weighed 195 grams and had a melting point of 130–132° C. The filtrate was diluted with 800 cc. of water and then concentrated under reduced pressure to about 500 cc. on a steam bath. Upon cooling, filtering and drying, there was obtained a second crop of crystalline product weighing 122 g. melting at 120–124° C. Further concentration of the filtrate yielded 6 g. of additional product. Upon recrystallization from 900 grams of ethanol, the pure product was obtained as white crystals which weighed 184 g. (88.4% of theoretical yield). The purified sample melted at 134° C. and analyzed as follows.

Calculated for N,N'-bis-(B-cyanoethyl)ethylene thiourea: Percent C, 51.91; percent H, 5.77; percent N, 26.9; percent S, 15.39. Found: Percent C, 51.68; percent H, 5.31; percent N, 26.89; percent S, 15.57.

A mixture of 10.4 g. of the above product, 45 g. of water and 5 g. of sodium hydroxide was boiled under reflux for 1½ hours. The mixture was cooled and neutralized with dilute hydrochloric acid to give a 95% yield of the dicarboxylic acid

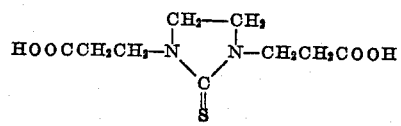

which forms colorless crystals melting at 137–138° C. after recrystallization from a mixture of toluene and dioxane. Its neutral equivalent was found to be 125. Theory 123. Its dimethyl ester melts at 44–46° C. It is readily obtained from the dinitrile by dissolving N,N'-bis-(B-cyanoethyl) ethylenethiourea in excess of methanol and saturating the solution with dry HCl. After 40 hours at room temperature, the methanol and HCl are distilled off under vacuum. The residue after crystallization from methanol yields the above dimethyl ester. Percent S calculated 11.68. Found: Percent S, 11.5. Sap. Equiv. Calculated, 137. Found: 139.

The following example illustrates a process carried out according to the invention for the production of N,N'-bis-(B-cyanoethyl) ethylene urea, and its dicarboxylic acid.

Example 2

64.5 g. (0.75 moles) of ethylene urea was dissolved in 300 cc. of pyridine at 60° C. After cooling to 45° C., 8 g. of a 40% solution of benzyl trimethylammonium hydroxide was added. This was followed by the dropwise addition at 45° C. of 89.5 g. (1.68 moles) of acrylonitrile, while stirring the mixture. The mixture was stirred three hours at room temperature, treated with sufficient hydrochloric acid to neutralize the catalyst and washed with two 500 cc. portions of ether to remove pyridine. The ether insoluble material after washing with water, and acetone, followed by drying was a thick oil which did not readily crystallize. Yield 95%. Its analysis agreed with the formula

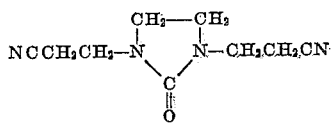

Upon boiling the compound with a slight excess of 10% sodium hydroxide solution for 1½ hours and neutralizing the solution as described in Example 1, the dicarboxylic acid

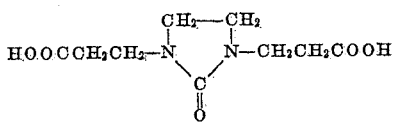

was obtained as a colorless crystalline substance, which after purification by extraction with acetone, melted at 123° C. Its neutral equivalent was found to be 118. Calculated 115.

I claim:

1. A compound represented by the formula

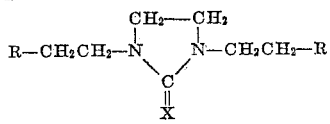

wherein X is a member of the group consisting of oxygen and sulfur atoms, and R is a member of the group consisting of —COOH, —COO (lower alkyl), and —CN.

2. The compound represented by the formula

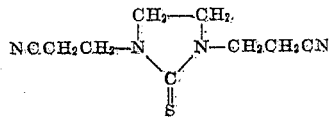

3. The compound represented by the formula

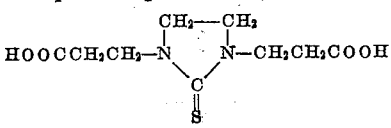

4. A lower alkyl ester of the acid set forth in claim 3.

5. The compound represented by the formula

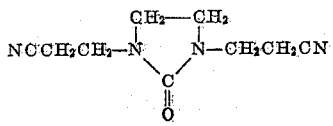

6. The compound represented by the formula

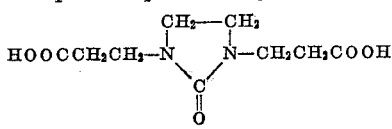

7. The process of producing a compound represented by the formula

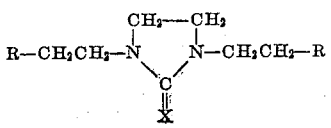

wherein X is a member of the group consisting of oxygen and sulfur atoms, and R is a member of the group consisting of —COOH, —COO (lower alkyl), and —CN, which comprises reacting one of the compounds of the group consisting of ethylene urea and ethylene thiourea with acrylonitrile in the presence of a strongly alkaline catalyst for the reaction and in the presence of an organic solvent for the reactants.

8. In the process of claim 7 using as a catalyst an alkaline compound of the group consisting of sodium hydroxide, potassium hydroxide, and trimethylammonium hydroxide, and as a solvent a compound of the group consisting of pyridine, dioxane, acetonitrile, benzene, toluene and xylene.

9. In the process of claim 7 subjecting the compounds to hydrolysis to form dicarboxylic acids thereof.

10. In the process of claim 9 subjecting the dicarboxylic acids to esterification to form the esters thereof.

References Cited in the file of this patent

Bruson: Organic Reactions, vol. V, J. Wiley & Sons, Inc., N. Y. C., pp. 79–136, 1949.